(12) United States Patent
Hines

(10) Patent No.: US 10,617,973 B1
(45) Date of Patent: Apr. 14, 2020

(54) CRYO-THERMAL DESALINATOR AND METHOD THEREOF

(71) Applicant: Garold P. Hines, Fernley, NV (US)

(72) Inventor: Garold P. Hines, Fernley, NV (US)

( * ) Notice: Subject to any disclaimer, the term of this patent is extended or adjusted under 35 U.S.C. 154(b) by 0 days.

(21) Appl. No.: 16/151,241

(22) Filed: Oct. 3, 2018

Related U.S. Application Data

(60) Provisional application No. 62/762,939, filed on May 25, 2018.

(51) Int. Cl.
*B01D 5/00* (2006.01)
*B01D 1/00* (2006.01)
(Continued)

(52) U.S. Cl.
CPC ........... *B01D 5/006* (2013.01); *B01D 1/0041* (2013.01); *B01D 1/0058* (2013.01);
(Continued)

(58) Field of Classification Search
CPC .... C02F 1/04; C02F 1/048; C02F 1/06; C02F 1/16; C02F 2103/08; B01D 1/0041;
(Continued)

(56) References Cited

U.S. PATENT DOCUMENTS

| | | | | |
|---|---|---|---|---|
| 3,535,210 | A | * | 10/1970 | Linde ................ C02F 1/16 203/11 |
| 3,675,436 | A | * | 7/1972 | Ganiaris ............ C02F 1/22 62/535 |

(Continued)

FOREIGN PATENT DOCUMENTS

GB 2516827 * 11/2015 ............... C02F 1/06

OTHER PUBLICATIONS

Shatat, Mahmoud and Saffa B. Riffat, "Water desalination technologies utilizing conventional and renewable energy sources", International Journal of Low-Carbon Technologies 2014, 9, pp. 1-19 (Apr. 2012).*

(Continued)

*Primary Examiner* — Renee Robinson
(74) *Attorney, Agent, or Firm* — Haverstock & Owens LLP

(57) ABSTRACT

Embodiments of the present invention are directed to a cryo-thermal desalinator, which addresses thermal desalination inefficiency by introducing intrinsic cooling potentials of strategically-piped liquidized gasses to save fuel and increase potable water output. Liquid natural gas fuel flows through internally routed, uninsulated and dedicated piping to natural gas brine burners located outside and under a vessel. The liquid natural gas fuel contributes to condensation and converts to eventual pre-warmed natural gas at the brine burners. Liquid gas flows through an internally routed, closed-loop piping to continually provide condensation, while a liquid gas compressor of the closed-loop exhausts waste heat to assist brine conversion. Saline water piping inside the vessel implements cooling via an optional alternative cooling heat exchanger, accepting portable liquid nitrogen, liquid $CO_2$ dry ice, or both. The cryo-thermal desalinator's multi-cooling liquid gas systems accommodate multi-thermal inputs, assisting with unfired production of thermal desalination water vapor in real time.

22 Claims, 7 Drawing Sheets

(51) Int. Cl.
*C02F 1/04* (2006.01)
*C02F 1/16* (2006.01)
*B63J 1/00* (2006.01)
*C02F 103/08* (2006.01)

(52) U.S. Cl.
CPC ......... *B01D 5/0003* (2013.01); *B01D 5/0006* (2013.01); *C02F 1/04* (2013.01); *C02F 1/048* (2013.01); *C02F 1/16* (2013.01); *B63J 1/00* (2013.01); *C02F 2103/08* (2013.01); *F17C 2221/033* (2013.01); *F17C 2223/0161* (2013.01)

(58) Field of Classification Search
CPC .... B01D 1/0058; B01D 5/006; B01D 5/0003; B01D 5/0006
See application file for complete search history.

(56) References Cited

U.S. PATENT DOCUMENTS

| | | | | |
|---|---|---|---|---|
| 3,714,791 | A | * | 2/1973 | Peck .......................... C02F 1/22 62/537 |
| 3,724,229 | A | * | 4/1973 | Seliber ..................... C02F 1/04 62/50.3 |
| 3,757,516 | A | | 9/1973 | McCabe |
| 4,054,176 | A | | 10/1977 | Van Huisen |
| 4,577,679 | A | | 3/1986 | Hibshman |
| 5,220,792 | A | | 6/1993 | Doron et al. |
| 5,911,684 | A | | 6/1999 | Shnell |
| 5,924,287 | A | | 7/1999 | Best |
| 6,216,463 | B1 | | 4/2001 | Stewart |
| 7,788,924 | B2 | | 9/2010 | Hines |

OTHER PUBLICATIONS

International Preliminary Report on Patentability, International Application No. PCT/US2005/046929, 30 pages.

WorldCat record from OCLC indicating that the U.S.A.I.D. Desalination Manuel was originally published in 1980 and also appeared in print under the title: Desinalination manuel IDEA 1981.

O.K. Buros, "Multi-efect Distillation", p. 9 in the ABC's of Desalting, International Desa;ination Association Topsfield, Massachusetts, USA circa 2000, 2nd edition, 32 pages.

* cited by examiner

US 10,617,973 B1

CRYO-THERMAL DESALINATOR AND METHOD THEREOF

RELATED APPLICATIONS

This application claims benefit of priority under 35 U.S.C. section 119(e) of the U.S. Provisional Patent Application Ser. No. 62/762,939, filed May 25, 2018, entitled "The Cryo-Thermal Desalinator," which is hereby incorporated by reference in its entirety.

FIELD OF THE INVENTION

The present invention relates to desalination. More particularly, the present invention relates to a cryo-thermal desalinator and a method thereof.

BACKGROUND OF THE INVENTION

Water shortage is a serious matter in certain regions of the world. For example, the Middle East has hardly any groundwater or freshwater sources and, as such, rely on desalination, which is a process of purifying saline or brackish water into potable water. However, traditional desalination solutions require a lot of energy, infrastructure and are costly. The present invention addresses at least these limitations in the prior art.

SUMMARY OF THE INVENTION

Embodiments of the present invention are directed to a cryo-thermal desalinator, which addresses thermal desalination inefficiency by introducing intrinsic cooling potentials of strategically-piped liquidized gasses to save fuel and increase potable water output. Liquid natural gas fuel flows through internally routed, uninsulated and dedicated, appropriate, heat-conductive piping to natural gas brine burners located outside and under a vessel. The liquid natural gas fuel contributes to condensation and converts to eventual pre-warmed natural gas at the brine burners. Liquid gas flows through an internally routed, closed-loop, uninsulated, piping to continually provide condensation, while a liquid gas compressor of the closed-loop exhausts waste heat to assist brine conversion. Saline water piping inside the vessel implements traditional cooling via an optional alternative cooling heat exchanger, accepting portable liquid nitrogen, liquid $CO_2$ dry ice, or both. The cryo-thermal desalinator's multi-cooling liquid gas systems accommodates multi-thermal inputs, assisting with unfired production of thermal desalination water vapor in real time.

In one aspect, a cryo-thermal desalinator (CTD) is provided. The CTD includes a thermal desalination vessel housing a brine container, and a liquid natural gas (LNG) fuel system. The LNG fuel system includes a first piping. The first piping enters into and exits out of the vessel at a set of ports and is coupled with an external LNG fuel source to receive LNG therefrom. The LNG is used as both a cryogenic coolant and combustion fuel through the first piping.

In some embodiments, a portion of the first piping is routed through a first condensation zone that is located inside the vessel.

In some embodiments, the LNG fuel system further includes a first condensation collector located inside the vessel and configured to collect potable droplets formed from vessel vapors condensed at the first condensation zone.

The LNG transitions to pre-warmed natural gas as the LNG flows through the first piping to burners located outside and below the vessel.

In some embodiments, the LNG fuel system further includes a downstream natural gas manifold, wherein the natural gas flows to the downstream natural gas manifold. Downstream use of the natural gas increases the flow of LNG to the downstream natural gas manifold, causing additional vessel condensation at the first condensation zone.

In some embodiments, the CTD also includes a saline water system. The saline water system includes a second piping. The second piping enters into the vessel at a port and is coupled with an external water source to receive saline water therefrom. The saline water flows through the second piping to the brine container.

In some embodiments, a portion of the second piping is routed through a second condensation zone that is located inside the vessel.

In some embodiments, the saline water system further includes a second condensation collector that is located inside the vessel and configured to collect potable droplets formed from vessel vapors condensed at the second condensation zone.

In some embodiments, the saline water system further includes an alternative cooling heat exchanger (ACHX) located outside the vessel and, when valved-in, is configured to cool the net saline water inlet temperature. The net cooler saline water inlet temperature causes additional vessel condensation at at least one condensation zone located inside the vessel. The ACHX can utilize dry ice, liquid nitrogen, or both.

In some embodiments, the CTD also includes a closed-loop cooling system. The cooling system includes a liquid gas compressor and a third piping enters into and exits out of the vessel at a different set of ports. Liquid gas flows through the third piping to and from the compressor. The liquid gas can be liquid $CO_2$, liquid $N_2$, or another suitable liquid gas.

In some embodiments, a portion of the third piping is routed through a third condensation zone that is located inside the vessel.

In some embodiments, the cooling system further includes a third condensation collector that is located inside the vessel and configured to collect potable droplets formed from vessel vapors condensed at the third condensation zone.

In some embodiments, the cooling system further includes an alternative thermal heat exchanger (ATHX) located outside the vessel and configured to receive BTUS from at least one thermal source to thereby contribute net heat to assist conversion of brine to vessel vapors. In some embodiments, the at least one thermal source is the compressor, and the liquid gas is used as both an internal cooling mechanism and external heating medium.

In another aspect, a cryo-thermal desalinator (CTD) is provided. The CTD includes a thermal desalination vessel that includes a plurality of condensation zones located inside the vessel. The CTD also includes an open-loop liquid natural gas (LNG) fuel system. The LNG fuel system includes a first piping that is routed into the vessel, through a first of the plurality of condensation zones, and out of the vessel towards burners. LNG fuel flowing through the first piping is configured as both a cryogenic coolant for facilitating condensation at the plurality of condensation zones and combustion fuel for the burners. The CTD also includes an open-loop saline water system. The saline water system includes a second piping that is routed into the vessel and through a second of the plurality of condensation zones towards a bottom of the vessel. Saline water flows through the second piping to the bottom of the vessel to be heated by the burners. The CTD also includes a closed-loop cooling system. The cooling system includes a third piping that is routed into the vessel, through a third of the plurality of condensation zones, and out of the vessel. A liquid coolant flowing through the third piping is used as an internal cooling mechanism for facilitating condensation at the plurality of condensation zones. Each of the systems generate potable water that is collected for output from the vessel.

In yet another aspect, a method of a cryo-thermal desalinator (CTD) is provided. The CTD includes a shared vessel. The method includes flowing, through a dedicated open-loop piping, saline water into the vessel. The method also includes flowing, through another dedicated open-loop piping, liquid natural gas (LNG) fuel into the vessel and out the vessel to burners configured to convert brine inside the vessel to vessel vapors. The LNG fuel flowing through the another dedicated piping is configured as both a cryogenic coolant for facilitating condensation the vessel vapors at the plurality of condensation zones inside the vessel and combustion fuel for the burners. The method also includes flowing a liquid coolant though a dedicated closed-loop piping into the vessel for facilitating additional condensation of the vessel vapors at the plurality of condensation zones. The method also includes collecting potable water formed by the condensation at the plurality of condensation zones.

In some embodiments, the method also includes providing an additional cooling input that can enabled to increase condensation at the plurality of condensation zones. In some embodiments, the method also includes providing an additional heat input that can be enabled to assist in the conversion of brine inside the vessel to vessel vapors.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein.

Figure 1A:
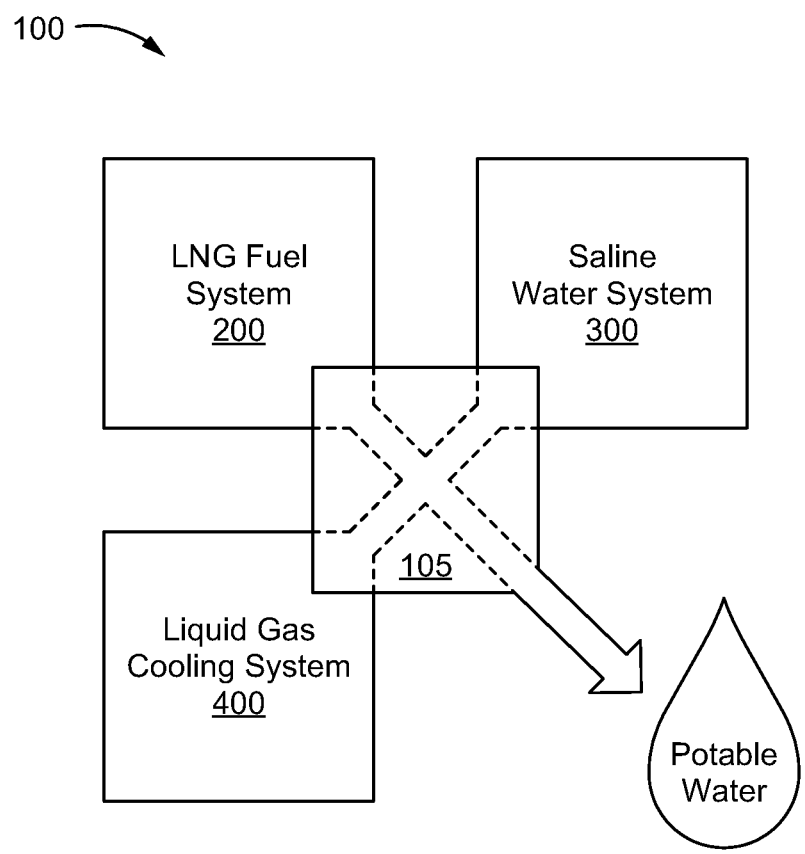
FIGS. 1A-1B illustrate an exemplary cryo-thermal desalinator in accordance with some embodiments.
Figure 1B:
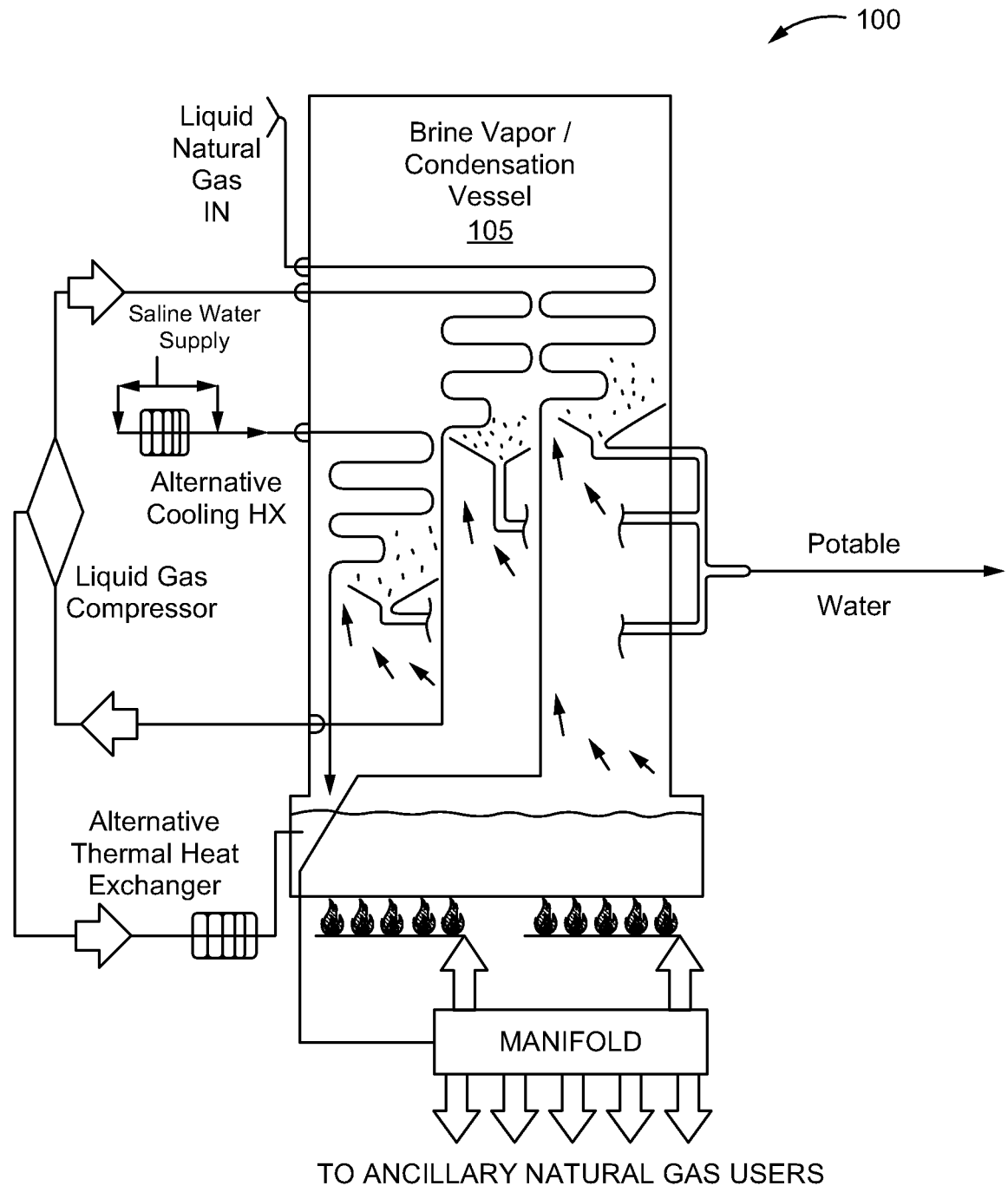

FIGS. 1A-1B illustrate an exemplary cryo-thermal desalinator 100 in accordance with some embodiments. FIG. 1A illustrates a high-level block diagram of the cryo-thermal desalinator 100, while FIG. 1B illustrates a more detailed schematic diagram of the cryo-thermal desalinator 100. As illustrated, the cryo-thermal desalinator 100 includes three main systems—a liquid natural gas (LNG) fuel system 200, a saline water system 300, and a liquid gas cooling system 400—that operate together to address thermal desalination inefficiency by introducing intrinsic cooling potentials of strategically-piped liquidized gasses to save fuel and increase potable water output. At least a portion of each of the systems 200-400 is housed within a shared thermal desalination vessel 105, and potable water generated by each of the systems 200-400 is collected for output from the vessel 105. The terms "potable water" and "fresh water" are used interchangeably herein and refer to water that is safe for human consumption.

Briefly, in the LNG fuel system 200, instead of natural gas that is traditionally routed through external insulated piping to brine burners, already-required liquid natural gas fuel flows through internally routed, uninsulated and dedicated piping to natural gas brine burners that are located outside and under the vessel 105. The liquid natural gas fuel contributes to $-260°$ F. condensation and converts to eventual pre-warmed natural gas at the brine burners. In the liquid gas cooling system 400, liquid gas flows through an internally routed, closed-loop piping to continually provide $-260°$ F. condensation, while a liquid gas compressor of the closed-loop exhausts waste heat to assist brine conversion. The liquid gas can be liquid $CO_2$, liquid $N_2$, or another suitable liquid gas. In the saline water system 300, water piping inside the vessel implements cooling via an optional discretionary alternative cooling heat exchanger, accepting portable liquid nitrogen, liquid $CO_2$ dry ice, or both. In some embodiments, each dedicated piping is made of copper, another thermally conductive metal, or other suitable material. The cryo-thermal desalinator's 100 multi-cooling liquid gas systems accommodate multi-thermal inputs, assisting with unfired production of thermal desalination water vapor in real time. The LNG fuel system 200, the saline water system 300, and the liquid gas cooling system 400 will now each be discussed in detail below.

Figure 2:
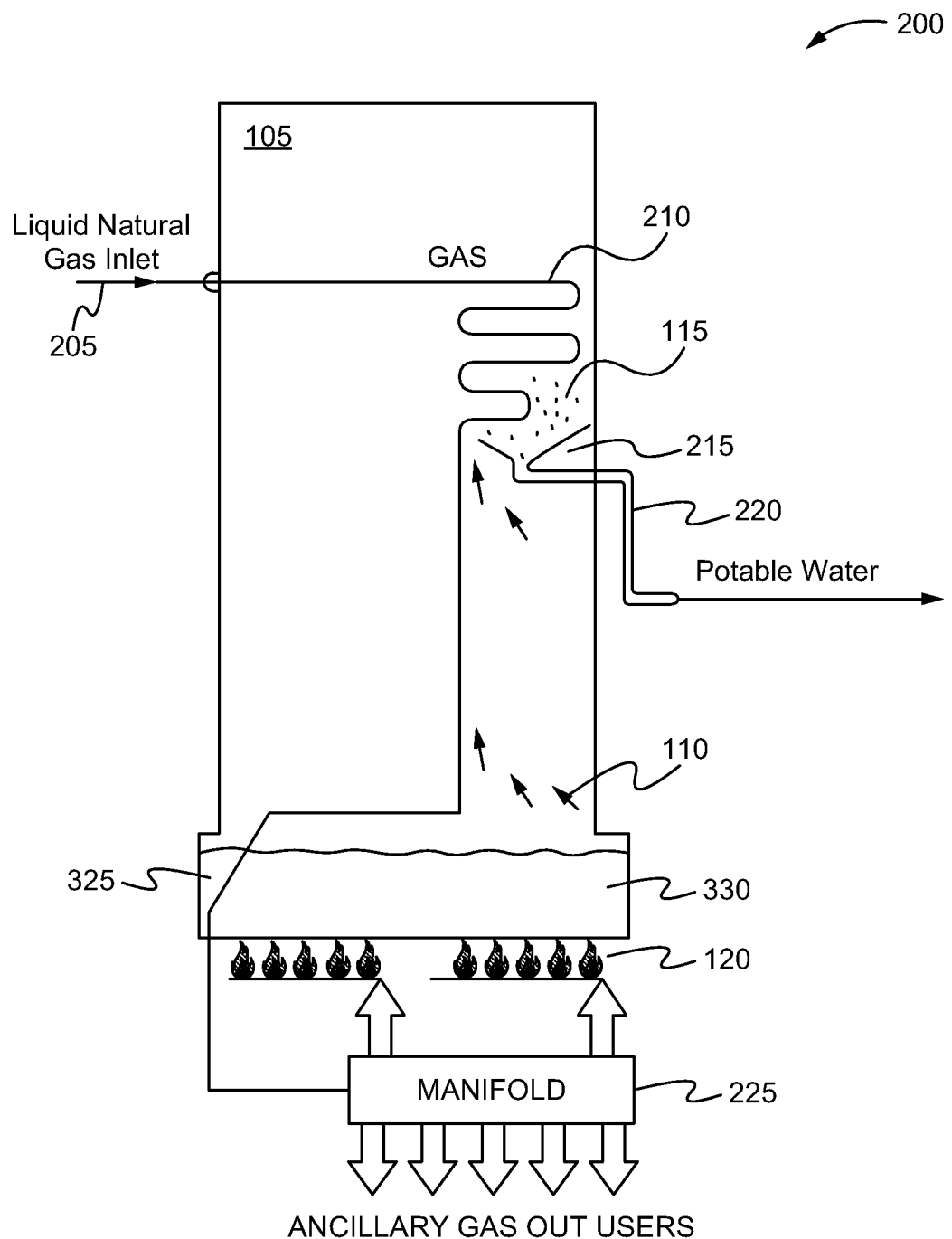
FIG. 2 illustrates an exemplary LNG fuel system in accordance with some embodiments.

FIG. 2 illustrates an exemplary LNG fuel system 200 in accordance with some embodiments. Liquid natural gas (LNG) enters the vessel 105 and is internally routed through an uninsulated and dedicated piping 205 to and beyond a vessel vapor condensation zone 210 en route to at least one set brine burners 120. The LNG transitions or converts to natural gas, moving through and beyond the condensation zone 210 to the brine burners 120. In some embodiments, there are at least two sets of brine burners 120. The piping 205 towards the brine burners 120 splits into the number of sets of brine burners 120 there are, to supply natural gas to all sets of brine burners 120. The brine burners 120 converts brine 325 in a brine container 330, which is internally located at the bottom of the vessel 105, to vessel vapors 110. The vessel vapors 110 condensed at the condensation zone 210 form potable water droplets 115 that are collected in a V-shaped condensation collector 215. The collected potable water droplets 115 in the condensation collector 215 flow therefrom to and through a potable water outlet pipe 220 and out of the vessel 105. In some embodiments, the portion of the piping 205 that is located past the brine burners 120 is coupled with a downstream natural gas manifold 225. The downstream natural gas manifold 225 supplies natural gas to various downstream ancillary natural gas users. Downstream natural gas usage increases the flow of natural gas beyond the brine burners 120, which in turn causes more vessel condensation, such as at the condensation zone 210 and/or other condensation zones inside the vessel 105, thereby increasing vessel vapors 110, potable water droplets 115 and potable water productivity. In some embodiments, the cryo-thermal desalinator 100 can be its own downstream natural gas user.

Figure 3A:
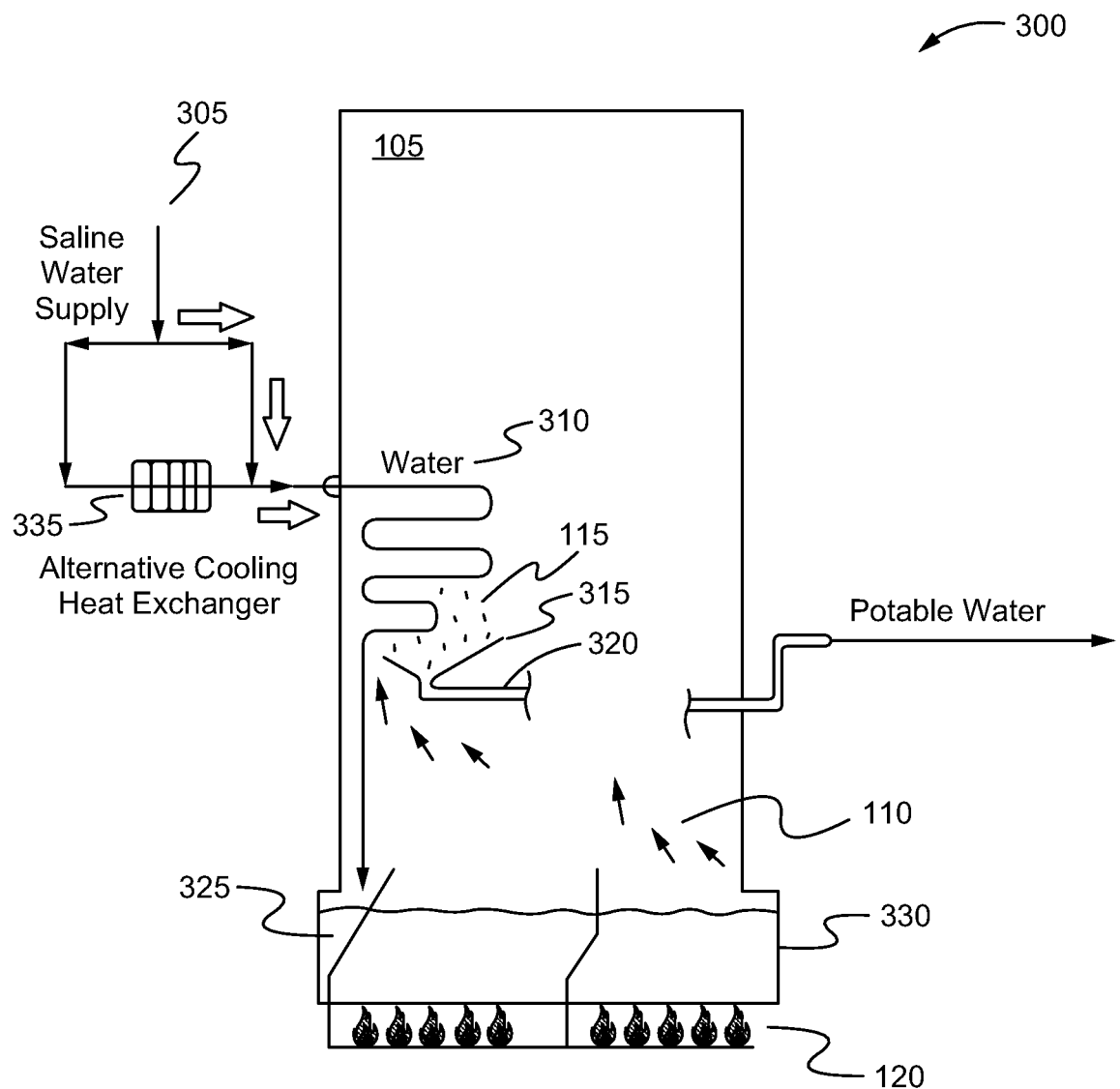
FIGS. 3A-3B illustrate an exemplary saline water system in accordance with some embodiments.
Figure 3B:
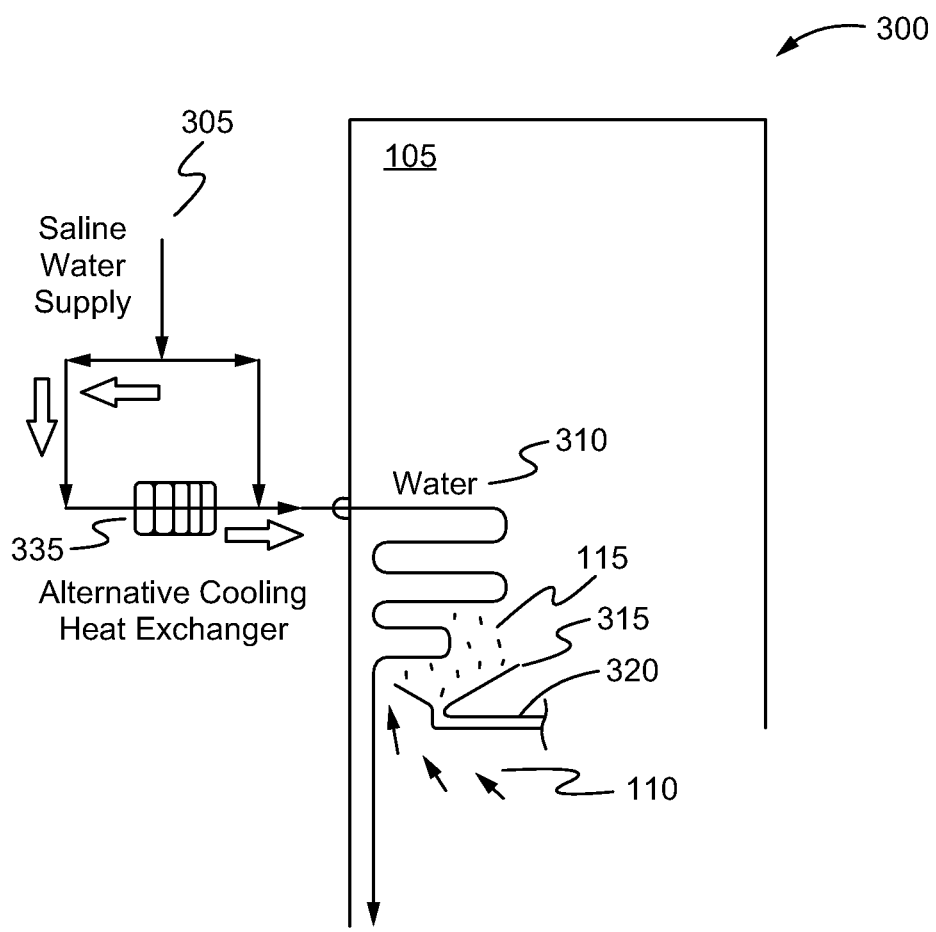

FIGS. 3A-3B illustrate an exemplary saline water system 300 in accordance with some embodiments. Saline water from a saline water source, such as the ocean, aquifers, lakes, and the like, enters the vessel 105 and is internally routed through an uninsulated and dedicated piping 305 to and beyond a vessel vapor condensation zone 310 en route to the brine container 330, where brine 325 is heated by the brine burners 120. The vessel vapors 110 condensed at the condensation zone 310 form potable water droplets 115 that are collected in a V-shaped condensation collector 315. The collected potable water droplets 115 in the condensation collector 315 flow therefrom to and through a potable water outlet pipe 320 and out of the vessel 105. In some embodiments, the outlet pipe 320 is joined with the outlet pipe 220, either inside or outside the vessel 105, to provide a single stream of potable water.

As illustrated in FIGS. 3A-3B, the saline water system 300 can include an alternative cooling heat exchanger (ACHX) 335 that is located outside the vessel 105. The ACHX 335 is coupled with the saline water inlet 305 at the vessel 105. In some embodiments, the ACHX 335 is normally valved out, as illustrated in FIG. 3A (saline water directly enters into the vessel 105 from a saline source), and can be valved into service. When valved into service, as illustrated in FIG. 3B, the saline water enters into the vessel 105 via the ACHX 335. The ACHX 335 cools the net saline water inlet temperature. The ACHX's 335 temporary capacity for an added cooling input to the saline water inlet causes more vessel condensation, such as at the condensation zone 310 and/or other condensation zones inside the vessel 105, thereby increasing vessel vapors 110, potable water droplets 115 and potable water productivity. This occasional extra cooling can use any form of low tech backup such as from readily available, over-the-counter −100° F. dry ice and/or −260° F. liquid nitrogen from potable sources like liquid nitrogen containers (e.g., Dewar flasks), or trucked-in liquid nitrogen. Other additional cooling methods are contemplated.

The net cooler saline water inlet temperature will require more LNG fuel burned at the brine burners 120 for conversion of the brine 325 into vessel vapor 110. Harder firing of the LNG increases LNG fuel flow through the piping 205, which in turn causes more vessel condensation, such as at the condensation zone 210 and/or other condensation zones, thereby also increasing vessel vapors 110, potable water droplets 115 and potable water productivity.

In some embodiments, the ACHX 335 is utilized in potable water emergencies (e.g., not enough potable water is being collected, or when the LNG fuel system 200, the liquid $CO_2$ cooling system 400, and/or other parts of the cryo-thermal desalinator 100 are down for repair/maintenance) because of associated costs and emission increases. Associated costs include purchasing dry ice and/or potable liquid nitrogen. Emissions are associated with burning more fossil fuel and $CO_2$ gas being reintroduced to the atmosphere from dry ice evaporation.

In some embodiments, operation of the ACHX 335 of the saline water system 300 is mostly dependent upon an alternative thermal heat exchanger (ATHX) peripheral BTU inputs. Extraneous heat source(s) at the ATHX advantageously reduces LNG fuel burning requirements to produce proper vessel vapor 110. However, fluctuating resultant LNG cooling will require consistent, significant cooling from another source since the ACHX 335 cannot compensate for full-time systemic cooling requirements.

Figure 4:
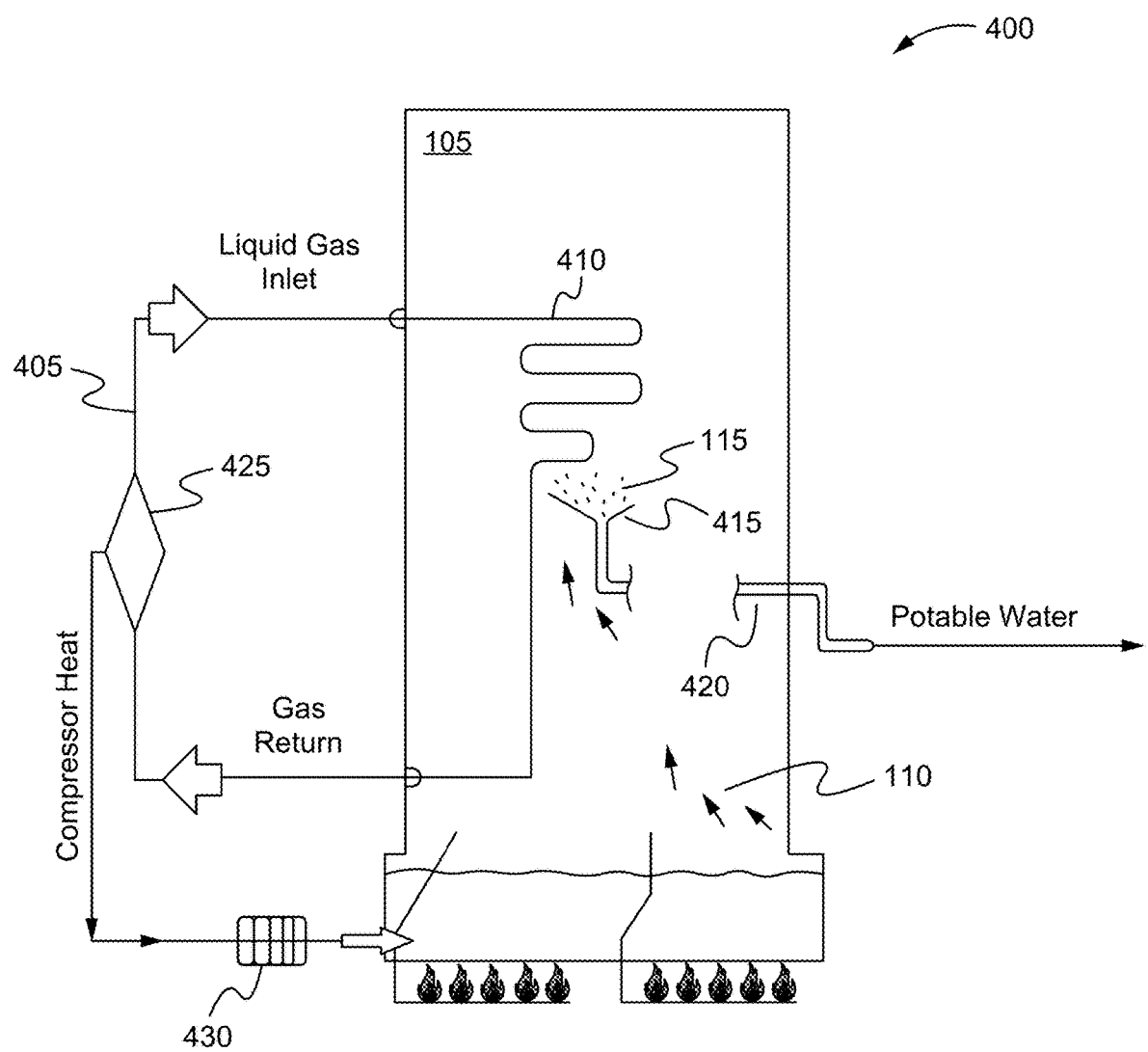
FIG. 4 illustrates an exemplary liquid gas cooling system in accordance with some embodiments.

FIG. 4 illustrates an exemplary liquid gas cooling system 400 in accordance with some embodiments. The liquid gas cooling system 400 provides the consistent cooling source for the fluctuating resulting LNG cooling. The LNG companion liquid gas cooling system 400 is a closed loop with −260° F. liquidized gas flowing through an uninsulated and dedicated piping 405 to produce potable water from condensation at a vessel vapor condensation zone 410. In particular, liquid gas leaves a liquid gas compressor 425 and enters the vessel 105 and is internally routed through the piping 405 to and beyond the condensation zone 410. The liquid gas condenses vessel vapors 110 at the condensation zone 410, which forms potable water droplets 115 that are collected in a V-shaped condensation collector 415. The collected potable water droplets 115 in the condensation collector 415 flow therefrom to and through a potable water outlet pipe 420 and out of the vessel 105. In some embodiments, the outlet pipe 420 is joined with the outlet pipe 120, 220 and/or the outlet pipe 320, either inside or outside the vessel 105, to provide a single stream of potable water. The liquid gas cooling system 400 advantageously has the ability to condense more potable water.

After flowing out the vessel 105, closed loop system gas returns to the liquid gas compressor 425. Captured heat-of-compression exhaust from the liquid gas compressor 425 contributes BTUS to the ATHX 430. This captured hot liquid gas discharge raises the temperature of the ATHX 430. In some embodiments, similar to the bypass configuration of the ACHX 335, a bypass configuration (not illustrated) can used to allow the captured hot liquid gas discharge from the liquid gas compressor 425 to be used as a thermal energy source downstream and rather at the ATHX 430. The liquid gas used in the liquid gas cooling system 400 is a liquid coolant and can be liquid $CO_2$, liquid $N_2$, or the like.

The liquid gas cooling system 400 capacity is based on collective potential thermal inputs at the ATHX 430. In some embodiments, the ATHX 430 can also receive BTUS from thermal sources such as, but not limited to, renewable solar, renewable geothermal, industrial waste heat, hot systemic liquid gas compressor exhaust, data centers, and/or the like. All of these thermal sources contribute net heat to assist conversion of the brine 325 in the brine container 330 into vessel vapors 110.

In some embodiments, the condensation zones 210, 310, 410 and their respective condensation collectors 215, 315, 415 are strategically positioned inside the vessel 105 to obtain effective condensation. For example, the condensation zones 210, 310, 410 can begin near vessel inlets for more effective condensation since fluids (e.g., LNG, saline water, liquid gas) flowing through the pipings 205, 305, 405 are much cooler when they first enter the vessel than when they progress further down the pipings 205, 305, 405.

In some embodiments, each piping 205, 305, 405 can be configured in a manner to achieve efficient potable water-droplet condensation. For example, a piping can be internally routed in a manner to obtain a total outer surface area of the piping at a respective condensation zone 210, 310, 410 that maximizes condensation at that condensation zone.

Alternatively or in addition to, the section of the piping at each condensation zone can include routing features with angles, tilts and/or bends to increase drop removal, such as by rolling off into a respective condensation collector 215, 315, 415. Alternatively or in addition to, the exterior surface of at least the section of the piping at each condensation zone is coated with a lubricant that is not miscible with water such that condensed drops can easily be removed by gravity into a respective condensation collector 215, 315, 415.

Figure 5:
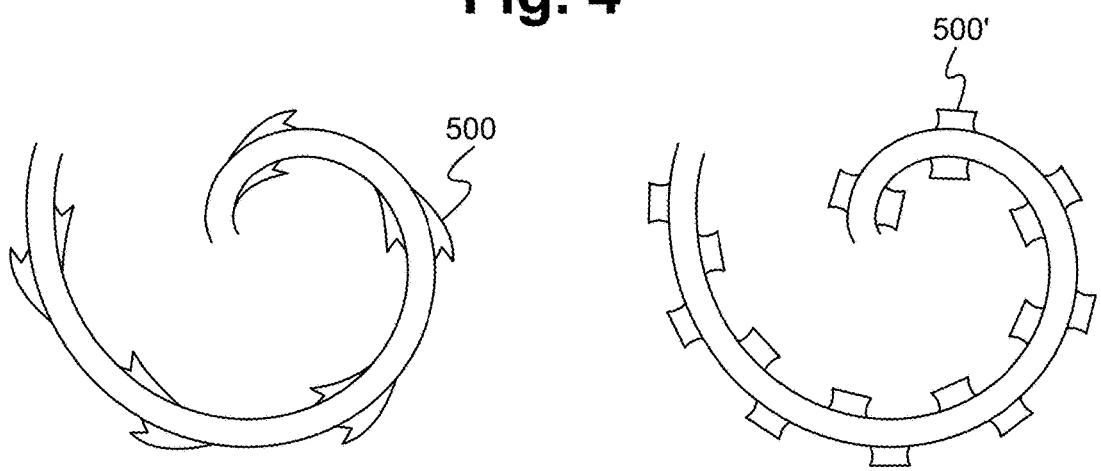
FIG. 5 illustrates exemplary directional fins in accordance with some embodiments.

Alternatively or in addition to, outer surfaces of the piping can include surface enhancing features. For example, the outer surfaces of the piping can be etched to increase the total outer surface area of the piping. Alternatively or in addition to, the outer surfaces of the piping can include directional fins to add thermal surface area to the piping, as illustrated in FIG. 5. Directional fins 500, 500' on the piping help manage the continual process of saline water injection, new vapor volume, and contraction into new potable water droplet ejection. Changes from saline water state to vessel vapor state to potable water state involve movement. The directional fins 500, 500' deflect the continuous act of vessel vapor becoming water droplets. These fins 500, 500' add thermal surface area to the piping, which increases heat exchange characteristics. In addition, the consistently angled fins 500, 500' act to direct the speed of condensation into potable water, which means that as water vapor collapses into potable water in the pressurized vessel, there is faster motion of molecules from one state to another at a rate of 1600-to-1. This vapor-to-water conversion creates vacuum and movement to a single coalescence point. The fins 500, 500' direct wholesale condensation in a coordinated swirl, creating coordinated centrifugal force. This outward motion will actively push formed water faster off the piping so that water will exit with enough kinetic energy to angularly depart the piping with a splash instead of passive, gravity-sheeting drips. Time of potable water turnover on the piping is reduced, permitting quicker cryo-recovery. Finned directionality improves cooling due to increased surface area with "rapid" thermal renewal. Volume of water-vapor-to-cooling-surface-temperature will determine speed of condensation and thus the coordinated efficiency of directional fins 500, 500' within the plurality of condensation zones. FIG. 5 illustrates two different exemplary fins 500, 500'. The fins 500 in the left image of FIG. 5 are arrow-shaped, while the fins 500' in the right image of FIG. 5 are razor-shaped. Other shapes are contemplated.

Regardless of the piping configuration, each removed drop preferably creates a less wet surface for fresh drop nucleation to allow for continuous condensation.

The additional capability of 1,600-to-one, vapor-to-droplet condensation inside the vessel 105 creates a stronger vapor vacuum within the vessel 105. This stronger vapor vacuum creates a lower pressure within the vessel 105, which in turn lowers the boiling temperature of the brine 325, advantageously resulting in fewer maintenance down times and corroded equipment (e.g., brine container 330 and saline system supply 305) replacement outages. In some embodiments, the boiling temperature of the brine 325 is approximately 170° F.

When the cryo-thermal desalinator 100 is in operation, the LNG is used as a cryogenic coolant and combustion fuel through the LNG fuel system's dedicated, internally routed, uninsulated thermal conductive piping (e.g., copper piping) inside the thermal desalination vapor vessel. The LNG flows through the piping to the natural gas brine burners and the downstream natural gas manifold. Downstream use of the natural gas increases net LNG flow, which in turn increases cryogenic upper-half vapor vessel condensation. As the LNG flows through the piping, it becomes warmer, more volatilized natural fuel, especially in the lower-half of the vessel, for increased fuel economy prior to reaching the brine burners and to the downstream natural gas manifold. The LNG flowing through the piping significantly lowers vacuum pressure, which promotes a lower boiling temperature for fewer maintenance down times and corroded equipment replacement outages. The liquid gas (e.g., liquid $CO_2$ or liquid $N_2$) continuously flowing through the liquid gas cooling system's dedicated, internally routed, uninsulated thermal conductive piping (e.g., copper piping) is used as an internal cooling mechanism and external heating medium. The ACHX coupled with the saline water inlet piping uses dry ice, liquid nitrogen Dewars and/or trucked liquid nitrogen, for emergency condensation assistance, to optionally pre-cool internally routed saline water. The ATHX coupled with the brine burners allows multi-heat inputs to augment vessel vapor production. For example, waste heat from the liquid gas compressor of the liquid gas cooling system can contribute BTUS to the ATHX to assist conversion of the brine in the brine container to vessel vapors. More net potable water is possible from intrinsic cryogenic liquidized gas condensation properties from LNG, liquid gas, and the ACHX, and from more volatilized natural gas fuel economy. Combined, the cryo-thermal desalinator cooling and heating at lower BTUS required for current thermal desalination vapor creation, promotes net lower $kWh/m^3$ (energy required to produce a cubic meter of potable water). All vapor vessel condensation by LNG, liquid gas, and ACHX inputs can accommodate all thermal inputs, producing measured cooling in real time.

In some embodiments, the vessel 105 is coupled with a strong suction auger (not illustrated) for periodically removing brine cake from the vessel 105. The auger can be manually driven and/or gas driven (e.g., using the natural gas from the LNG fuel system 200). Brine cakes removed from the vessel 105 are valuable and can be re-purposed as, for example, salt licks for animals.

Figure 6:
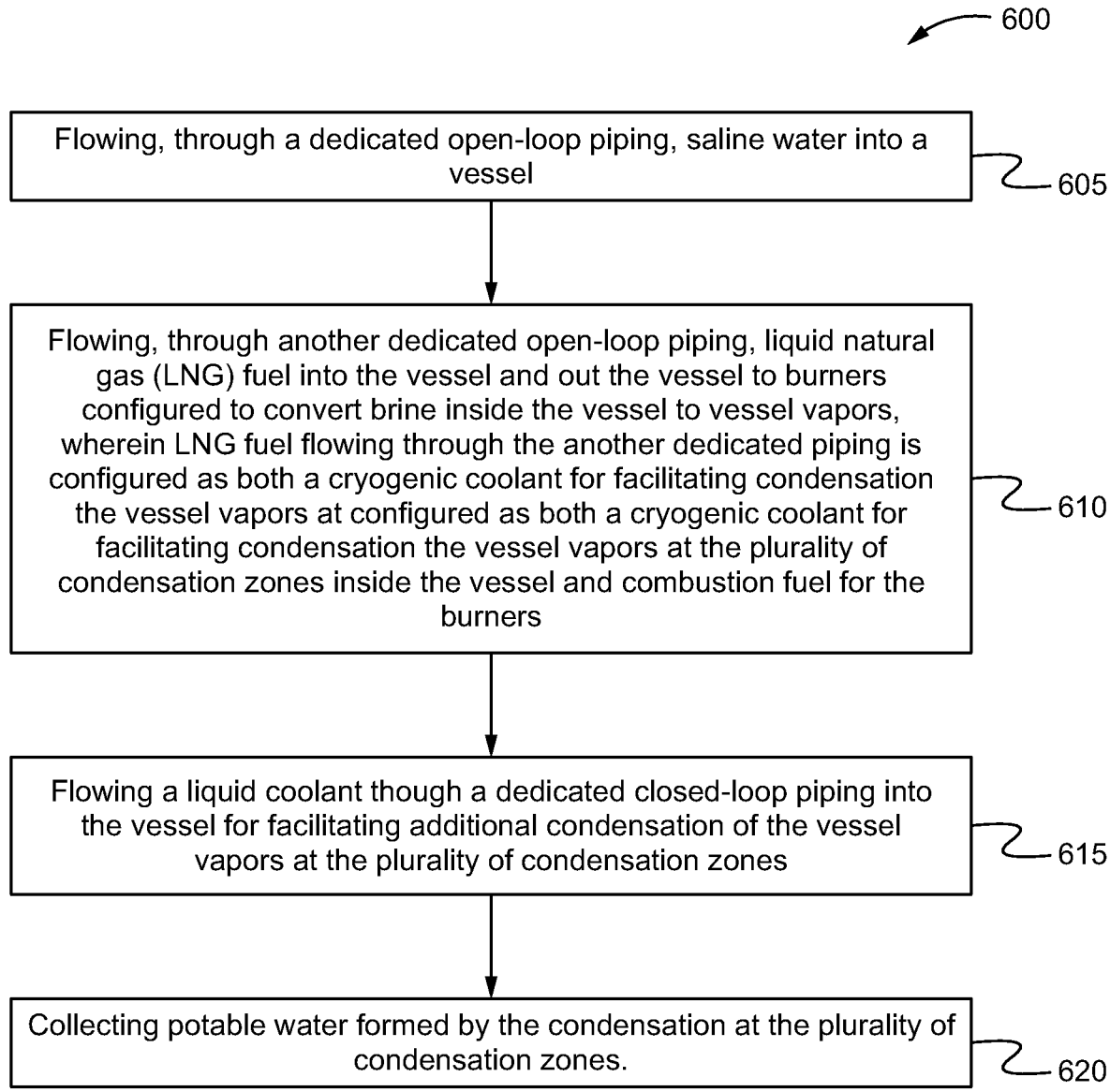
FIG. 6 illustrates an exemplary method of the cryo-thermal desalinator of FIGS. 1A-1B in accordance with some embodiments.

FIG. 6 illustrates an exemplary method 600 of the cryo-thermal desalinator 100 of FIGS. 1A-1B in accordance with some embodiments. At a Step 605, where saline water from a saline water source flows, through a dedicated open-loop piping, into a vessel. At a Step 610, liquid natural gas (LNG) fuel from a LNG fuel source flows, through another dedicated open-loop piping, into the vessel and out the vessel to burners configured to convert brine inside the vessel to vessel vapors. The LNG fuel flowing through the another dedicated piping is configured as both a cryogenic coolant for facilitating condensation of the vessel vapors at the plurality of condensation zones inside the vessel and combustion fuel for the burners. In some embodiments, an additional cooling input is provided and can be enabled to increase condensation at the plurality of condensation zones. For example, the additional cooling input can include a cooling heat exchanger, accepting portable liquid nitrogen, liquid $CO_2$ dry ice, or both, to cool the net saline water inlet temperature. At a Step 615, liquid coolant flows, though a dedicated closed-loop piping, into the vessel for facilitating additional condensation of the vessel vapors at the plurality of condensation zones. The liquid coolant can be liquid $CO_2$, liquid $N_2$, or another suitable liquid coolant. In some embodiments, an additional heat input is provided and can be enabled to assist in the conversion of the water inside the vessel to vessel vapors. For example, the additional heat input could be waste heat exhausted from a heat exchanger configured to keep the coolant flowing through the dedicated closed-loop piping cool. At a Step 620, potable water formed by the condensation at the plurality of condensation zones is collected. In some embodiments, the fluids of the cryo-thermal desalinator 100 currently flow through the The present invention is more effective and better for the environment than traditional desalination systems, such as reverse osmosis desalination systems. In a reverse osmosis desalination system, a semipermeable membrane is used to remove ions, molecules and larger particles from seawater. However, water must be pre-treated with chemicals to prevent the membrane from clogging. Pumps are used to apply pressure and force to push pre-treated water through the membrane. Salt remains on one side of the membrane, while filtered water passes to the other side. While the membrane removes salt and eliminates bacteria, the membrane is not easy to deal with because it is filled with bacteria and, thus, must be cleaned often or replaced. Furthermore, removal of discharge of chemical waste and toxins must be handled by hazmat teams. Reverse osmosis also wastes a large amount of the water that runs through its system. It typically wastes one gallon for every three or four gallons of filtered water it produces.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

I claim:

1. A cryo-thermal desalinator (CTD) comprising:
a thermal desalination vessel housing a brine container;
a liquid natural gas (LNG) fuel system including a first piping, wherein the first piping enters into and exits out of the vessel at a set of ports and is coupled with an external LNG fuel source to receive LNG therefrom, wherein the LNG is used as both a cryogenic coolant and combustion fuel through the first piping; and
burners coupled to the first piping, the burners configured to heat the brine container using the LNG.

2. The cryo-thermal desalinator (CTD) of claim 1, wherein a portion of the first piping is routed through a first condensation zone that is located inside the vessel.

3. The cryo-thermal desalinator (CTD) of claim 2, wherein the LNG fuel system further includes a first condensation collector located inside the vessel and configured to collect potable droplets formed from vessel vapors condensed at the first condensation zone.

4. The cryo-thermal desalinator (CTD) of claim 3, wherein the LNG transitions to pre-warmed natural gas as the LNG flows through the first piping to the burners located outside and below the vessel.

5. The cryo-thermal desalinator (CTD) of claim 4, wherein the LNG fuel system further includes a downstream natural gas manifold, wherein the natural gas flows from the burners to the downstream natural gas manifold.

6. The cryo-thermal desalinator (CTD) of claim 5, wherein downstream use of the natural gas increases the flow of LNG to the downstream natural gas manifold, causing additional vessel condensation at the first condensation zone.

7. The cryo-thermal desalinator (CTD) of claim 6, further comprising a saline water system, wherein the saline water system includes a second piping, wherein the second piping enters into the vessel at a port and is coupled with an external water source to receive saline water therefrom, wherein the saline water flows through the second piping to the brine container.

8. The cryo-thermal desalinator (CTD) of claim 7, wherein a portion of the second piping is routed through a second condensation zone that is located inside the vessel.

9. The cryo-thermal desalinator (CTD) of claim 8, wherein the saline water system further includes a second condensation collector that is located inside the vessel and configured to collect potable droplets formed from vessel vapors condensed at the second condensation zone.

10. The cryo-thermal desalinator (CTD) of claim 9, wherein the saline water system further includes an alternative cooling heat exchanger (ACHX) located outside the vessel and, when valved-in, is configured to cool a net saline water inlet temperature.

11. The cryo-thermal desalinator (CTD) of claim 10, wherein the net cooler saline water inlet temperature causes additional vessel condensation at at least one condensation zone located inside the vessel.

12. The cryo-thermal desalinator (CTD) of claim 11, wherein the ACHX utilizes dry ice, liquid nitrogen, or both.

13. The cryo-thermal desalinator (CTD) of claim 12, further comprising a closed-loop cooling system, wherein the cooling system includes a liquid gas compressor and a third piping enters into and exits out of the vessel at a different set of ports, wherein liquid gas flows through the third piping to and from the compressor.

14. The cryo-thermal desalinator (CTD) of claim 13, wherein a portion of the third piping is routed through a third condensation zone that is located inside the vessel.

15. The cryo-thermal desalinator (CTD) of claim 14, wherein the cooling system further includes a third condensation collector that is located inside the vessel and configured to collect potable droplets formed from vessel vapors condensed at the third condensation zone.

16. The cryo-thermal desalinator (CTD) of claim 15, wherein the cooling system further includes an alternative thermal heat exchanger (ATHX) located outside the vessel and configured to receive BTUS from at least one thermal source to thereby contribute net heat to assist conversion of brine to vessel vapors.

17. The cryo-thermal desalinator (CTD) of claim 16, wherein the at least one thermal source is the compressor, wherein a liquid gas is used as both an internal cooling mechanism and external heating medium.

18. A cryo-thermal desalinator comprising:
a thermal desalination vessel including a plurality of condensation zones located inside the vessel;
an open-loop liquid natural gas (LNG) fuel system including a first piping that is routed into the vessel, through a first of the plurality of condensation zones, and out of the vessel towards burners, wherein LNG fuel flowing through the first piping is configured as both a cryogenic coolant for facilitating condensation at the first condensation zone and combustion fuel for the burners;
an open-loop saline water system including a second piping that is routed into the vessel and through a second of the plurality of condensation zones towards a bottom of the vessel, wherein saline water flows through the second piping to the bottom of the vessel to be heated by the burners; and
a closed-loop cooling system including a third piping that is routed into the vessel, through a third of the plurality of condensation zones, and out of the vessel, wherein a liquid coolant flowing through the third piping is used as an internal cooling mechanism for facilitating condensation at the third condensation zone, wherein each of the systems generate potable water that is collected for output from the vessel.

19. A method of using a cryo-thermal desalinator that includes a shared vessel, comprising:
- flowing, through a dedicated open-loop piping, saline water into the vessel;
- flowing, through another dedicated open-loop piping, liquid natural gas (LNG) fuel into the vessel through a first of a plurality of condensation zones and out the vessel to burners configured to convert brine inside the vessel to vessel vapors, wherein the LNG fuel flowing through the another dedicated piping is configured as both a cryogenic coolant for facilitating condensation the vessel vapors at the first condensation zone inside the vessel and combustion fuel for the burners;
- flowing a liquid coolant though a dedicated closed-loop piping into the vessel through a second condensation zone and out the vessel for facilitating additional condensation of the vessel vapors at the second condensation zone; and
- collecting potable water formed by the condensation at the plurality of condensation zones.

20. The method of claim 19, further comprising:
- providing an additional cooling input that can be enabled to increase condensation at the plurality of condensation zones; and
- providing an additional heat input that can be enabled to assist in the conversion of brine inside the vessel to vessel vapors.

21. The method of claim 19, further including routing features on the piping.

22. The method of claim 19, further including surface enhancing features on the piping.

* * * * *